3,198,661
IMPREGNATED SHOE SOLE LEATHER
William D. Johnson, Madison, Wis., assignor to Oscar Mayer & Company, Inc., Chicago, Ill., a corporation of Illinois
No Drawing. Filed July 31, 1961, Ser. No. 127,830
4 Claims. (Cl. 117—142)

This invention relates, generally, to innovations and improvements in the impregnation of specially tanned leather with certain liquid polysulfide polymers to provide a finished product which is especially useful for shoe soles, and which is characterized by its excellent resistance to wear, oil and water, its good premeability to water vapor and air, its high degree of flexibility, and ease of cementing, cutting and shaping.

It has long been known to impregnate leather with various materials, including liquid polysulfide polymers, in order to improve and desirably modify the leather for specific uses. As pointed out by Cranker and Jorczak in their paper entitled, "Use of Polysulfide Liquid Polymers for Impregation of Leather," The Journal of the American Leather Chemists Association, vol. XLVII, No. 3, March 1952, pp. 178–191, leather impregnated with this type of synthetic rubber has been primarily used for industrial applications such as flange seals, pump cups, backup washers, hydraulic packings and cups, and beltings, but only tested to a limited extent in the manufacture of the inner soles, uppers and counters of shoes. A later article along the same line by Cranker alone, entitled, "Leather Impregnation With Polysulfide Liquid Polymers for Hydraulic Packings and Oil Seals," appeared in the December 1956 issue of The Leather Manufacture, pp. 42–45.

Among the patents which have issued relating to the impregnation of leathers with liquid polysulfide polymers are Cheronis 2,721,145, dated October 18, 1955, and Cranker 2,836,972, dated June 31, 1958.

Despite the prior investigations and substantial development done by those skilled in the art, as represented by the above mentioned technical papers and patents, shoe sole leather impregnated with liquid polysulfide polymers has not gained commercial importance or success for a number of reasons. In accordance with the present invention an improved and novel method or procedure for impregnating leather with liquid polysulfide polymers is provided which produces on a competitive cost basis shoe soles which are superior by all the common comparative tests and standards, as well as certain additional tests that will be mentioned. The method or process of the present invention involves certain combinations of steps and features which permit achievement of the desired end results. Some of these individual steps and features may be broadly, or even specifically, disclosed in the prior art, while others are novel in themselves. However, the various steps and features are critical within the limits indicated, and the over-all combination of the steps and essential features is new.

The object of the invention, generally stated, is the provision on a competitive cost basis of improved rubber impregnated leather, especially useful for shoe soles but also having other uses, which is characterized in the following respects: the sole leather will equal or exceed presently available shoe leather with regard to wearability, water-proofness, and oil resistance; it has good air and water vapor permeability; exhibits excellent adherence to shoes with the adhesives commonly used in the shoe industry; can be readily cut, worked, stitched or sewed by common methods and equipment used in the manufacture and repair of shoes; can be used for heel lifts as well as soles; will not crack on bending; will not slip when wetted by water; does not require moisture treatment before using (i.e., does not require mulling); and, will not deteriorate on aging.

An important object of the invention is a provision of a commercially satisfactory method or process of manufacturing impregnated sole leather exhibiting the above mentioned characteristics and properties.

Certain other objects will, in part, be obvious and will in part appear hereinafter.

For a more complete understanding of the nature and scope of the invention reference may now be had to the following detailed description thereof wherein a specific working example is given in detail and certain permissible variations therein are outlined.

The two main materials used in practicing the invention are specially prepared or tanned leather and a particular type of liquid polysulfide polymer. Certain other materials are required in specific amounts as will be indicated.

Prior to its treatment and impregnation in accordance with the present invention, the animal hide is tanned in a manner departing in certain respects from conventional tanning procedures. More specifically, the leather (e.g., cowhide, steerhide, or bull hide, or other hides used for tanning) must be a chrome tanned, or chrome retanned leather containing a minimum of about 3 to 5% by weight $Cr_2O_3$ from a basic chrome sulfate tanning mixture. The retannage should be made with a natural vegetable retanning material, such as quebracho and shall be in amount from about 10 to 30% by weight. Departing from the conventional, the maximum content of oil, fat liquor, or similar lubricating material must not exceed about 2% by weight. The oil shall be of the type referred to in the leather industry as cationic oil. The leather shall be swelled to such a degree as to permit easy penetration of rubber dissolved in solvents. The leather shall be dried to a moisture content not in excess of about 10% by weight. The leather should preferably be buffed or sanded lightly on the grain and flesh sides to partially open the porous structure to allow for more uniform penetration of the rubber solution. Except with regard to the specific conditions mentioned, the leather may be otherwise prepared to be tanned in accordance with known conventional procedures.

The synthetic rubber used for impregnating the leather in the present invention is of the generic group of synthetic rubbers referred to as liquid polysulfide polymers. However, one particular type of this class of polymers has been found to be useful in the present invention. The main repeating segment in the polymeric chain, i.e., the average polymer segment, is represented by the following structure:

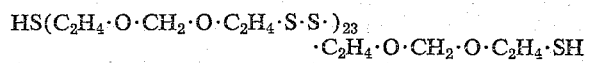

This polysulfide liquid polymer contains 2% of the trifunctional agent, trichloro propane, added in the original material to develop cross links, along the sides of the main chain. The liquid polymer has the following physical properties:

Physical state _____ Viscous liquid.
Color _____ Light amber.
Specific gravity _____ 1.27.
Viscosity at 80° F., poises _____ 350–450.
Average molecular weight _____ 4000.
pH (water extract) _____ 6.0–8.0.
Moisture content, percent _____ 0.1–0.2.
Stability _____ Over 3 years.
Density _____ 10.6 lbs. 1 gal.

A commercially available polysulfide liquid polymer having the above composition and physical properties is available under the proprietary designation, Thiokol LP–

2, manufactured by the Thiokol Chemical Corporation, Trenton, New Jersey.

*Example*

46.9 lbs. of ethylene dichloride are weighed into a mixing container coated with rubber on the interior since no metal can be allowed to come into contact with the rubber or leather. 42.5 lbs. parts of Thiokol LP-2 is warmed to 90° F. and poured into the ethylene dichloride solvent. This mixture is stirred mechanically with a high speed stirring device for 10 minutes producing a uniform solution. 1410 ml. of cumene hydroperoxide and 1350 ml. of propylene oxide are added to the solution and the mixture is stirred for 20 minutes. 2350 ml. of a 2% solution of diphenyl guanidine in methyl ethyl ketone is then added, and stirring continued for 5 minutes.

112 to 120 lbs. of leather having a total surface area of 125 to 150 sq. ft. is folded and placed in a rubber coated metal drum 38 inches wide and 62 inches in diameter, fitted with a door opening sufficiently large to accept full sides of leather. One side of the drum is perforated at the center to relieve pressure developed within the drum. 99.14 lbs. of the rubber solution is poured on top of the leather in the drum, the door is closed tightly, and the drum is revolved at 18 r.p.m. for 60 minutes.

At the end of 60 minutes the leather is removed from the drum and air dried, with the grain of the leather exposed free to the air for at least 16 hours. The leather is then hung in a curing oven and air at 145–155° F. is circulated around the leather for 3½ to 4 hours. The leather is then removed from the curing oven.

The leather is buffed (sanded), brushed clean, sprayed in the horizontal position with two successive coats of brown pigment, allowed to air dry 24 hours, and sprayed with aniline finish. The leather is then subjected for 30 seconds to a hot press with both top and bottom plates heated to produce a smooth finish, odor free, impregnated leather, and to complete curing of the rubber used.

Certain permissible variations may be made in the foregoing example. The following ranges in quantities of each ingredient may be used if the deviation from the example is made in only one ingredient at a time:

| | | |
|---|---|---|
| Ethylene dichloride | lbs | 45 to 55 |
| Polysulfide polymer | lbs | 35 to 45 |
| Cumene hydroperoxide | lbs | 3.1 to 3.2 |
| Propylene oxide | lbs | 2.4 to 2.5 |
| Diphenyl guanidine in from about 1000 to 3000 ml. of ethyl ketone | grams | 45 to 50 |

The leather should have a surface area of from about 1 to 1.25 sq. ft. per pound. The drum should have a diameter of about 60 to 96 inches and its width may vary from 36 to 60 inches. The speed of rotation may vary from about 16 to 20 r.p.m. and should be continued for at least about 45 minutes, but not more than about 75 minutes. The air temperature for air curing may range from about 140–160° F. and the time may range from about 3.5 up to 5 hours.

Having described the invention and set forth the best manner of practicing it what is claimed as new is:

I claim:

1. The method of impregnating leather with liquid polysulfide polymers which comprises: preparing an impregnating solution by introducing into a mixing container from 45 to 55 parts by weight of ethylene dichloride, adding from 35 to 45 parts of liquid polysulfide polymer warmed to from about 70 to 90° F. and having an average molecular weight of about 4000, an average polymer segment structure of the formula $$HS(C_2H_4.O.CH_2.O.C_2H_4.S.S.)_{23}.C_2H_4.O.CH_2.O.C_2H_4.SH$$

and containing about 2% by weight of trichloro propane as a cross linking agent, stirring the contents of the mixer sufficiently to produce a uniform solution thereof, adding to the contents of the mixer from 3.1 to 3.2 parts by weight of cumene hydroperoxide and from 2.4 to 2.5 parts by weight of propylene oxide, stirring the resulting mixture for from about 10 to 20 minutes, adding to the contents of the mixer a solution of from 0.1 to 0.11 part of diphenyl guanidine in from 1.77 to 5.31 parts by weight of methyl ethyl ketone, and stirring the resulting mixture for at least about 5 minutes; introducing into an impregnating drum having a diameter of about 60 to 96 inches and a width of about 36 to 60 inches and mounted for rotation with its principal axis horizontally alinged, from about 112 to 120 parts by weight of dry partially tanned leather selected from the group consisting of chrome tanned and chrome retanned leather containing at least about 3 to 5% by weight of $Cr_2O_3$ from a basic chrome sulfate tanning mixture, having a moisture content not in excess of about 10%, and containing not in excess of about 2% oil or fat liquor, said leather having a surface area of from about 1 to 1.25 sq. ft. per pound; introducing said impregnating solution into said drum; rotating said drum at from about 16 to 20 r.p.m. for about 45 to 75 minutes until said leather is completely impregnated; removing the impregnated leather from the drum and air drying the same for at least about 16 hours; and curing the rubber in the leather by exposing the surfaces thereof to circulating air at a temperature in the range of about 140 to 165° F. for from about 3.5 to 5 hours.

2. The method of claim 1 wherein the leather after oven curing is buffed, brushed clean, sprayed with pigment, allowed to air dry in a horizontal position for about 24 hours, sprayed with an aniline finish, dried in a horizontal position and heat pressed.

3. Leather produced by the method of claim 1.

4. Leather produced by the method of claim 2.

References Cited by the Examiner

UNITED STATES PATENTS

| | | | |
|---|---|---|---|
| 2,466,963 | 4/49 | Patrick et al. | |
| 2,721,145 | 10/55 | Cheronis | 117—142 X |
| 2,877,197 | 3/59 | Fisher | 117—142 X |
| 2,933,418 | 4/60 | Dogliotti et al. | 117—142 X |
| 2,940,958 | 6/60 | Smith | 260—79.1 |

RICHARD D. NEVIUS, *Primary Examiner.*

JOSEPH B. SPENCER, *Examiner.*

UNITED STATES PATENT OFFICE
CERTIFICATE OF CORRECTION

Patent No. 3,198,661                        August 3, 1965

William D. Johnson

It is hereby certified that error appears in the above numbered patent requiring correction and that the said Letters Patent should read as corrected below.

Column 1, line 14, for "premeability" read -- permeability --; column 3, line 48, for "ethyl ketone" read -- methyl ethyl ketone --; column 4, line 25, for "alinged" read -- aligned --.

Signed and sealed this 19th day of July 1966.

SEAL)
Attest:

ERNEST W. SWIDER                                     EDWARD J. BRENNER
Attesting Officer                                          Commissioner of Patents